(12) United States Patent
Hao et al.

(10) Patent No.: US 7,819,011 B2
(45) Date of Patent: Oct. 26, 2010

(54) HIGH-Q LONGITUDINAL BLOCK RESONATORS WITH ANNEXED PLATFORMS FOR MASS SENSING APPLICATIONS

(75) Inventors: Zhili Hao, Marietta, GA (US); Farrokh Ayazi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1015 days.

(21) Appl. No.: 11/450,186

(22) Filed: Jun. 9, 2006

(65) Prior Publication Data

US 2007/0089519 A1    Apr. 26, 2007

Related U.S. Application Data

(60) Provisional application No. 60/710,713, filed on Aug. 23, 2005.

(51) Int. Cl.
*G01H 11/00* (2006.01)
(52) U.S. Cl. .......................................... 73/649; 73/579
(58) Field of Classification Search .................. 73/579, 73/649, 570, 586, 602, 625, 646
See application file for complete search history.

(56) References Cited

U.S. PATENT DOCUMENTS

| | | | | |
|---|---|---|---|---|
| 3,164,004 A | * | 1/1965 | King, Jr. ..................... 73/24.06 |
| 4,215,570 A | * | 8/1980 | Eer Nisse ................. 73/862.59 |
| 4,517,841 A | * | 5/1985 | Peters et al. .............. 73/514.13 |
| 4,548,079 A | * | 10/1985 | Klatt ........................... 73/865 |
| 5,121,180 A | * | 6/1992 | Beringhause et al. ........ 257/417 |
| 5,349,844 A | * | 9/1994 | Lilienfeld ................... 73/28.01 |
| 5,668,303 A | * | 9/1997 | Giesler et al. .............. 73/24.06 |
| 6,457,361 B1 | * | 10/2002 | Takeuchi et al. .............. 73/580 |
| 7,089,813 B2 | * | 8/2006 | Takeuchi et al. .............. 73/865 |
| 7,279,131 B2 | * | 10/2007 | Wendelbo et al. .......... 422/68.1 |
| 7,458,265 B2 | * | 12/2008 | Shih et al. ...................... 73/579 |
| 2005/0016276 A1 | * | 1/2005 | Guan et al. .................... 73/579 |
| 2007/0089519 A1 | * | 4/2007 | Hao et al. ..................... 73/649 |

* cited by examiner

*Primary Examiner*—Hezron Williams
*Assistant Examiner*—Samir M Shah
(74) *Attorney, Agent, or Firm*—Bryan W. Bockhop; Bockhop & Associates, LLC

(57) ABSTRACT

Disclosed are sensing apparatus, such as mass sensors, comprising longitudinal block resonators having annexed platforms that offer the improved mass sensitivity at micron scale, high-Q in air, simplicity of fabrication, and improved reliability. Exemplary mass sensors comprise a central block separated from a substrate. Two annexed platforms are coupled to the central block by way of two separating beams that are separated from the substrate. One or more anchors are coupled to the central block by way of support beams that are separated from the substrate by insulating material. One or more transducers are provided for actuating and sensing vibration of the central block and the annexed platforms. The transducers may employ capacitive and piezoelectric drive and sense schemes.

16 Claims, 11 Drawing Sheets

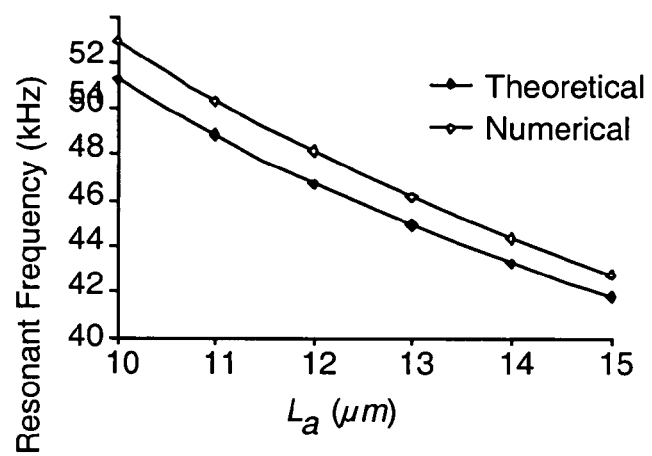
Fig. 8a
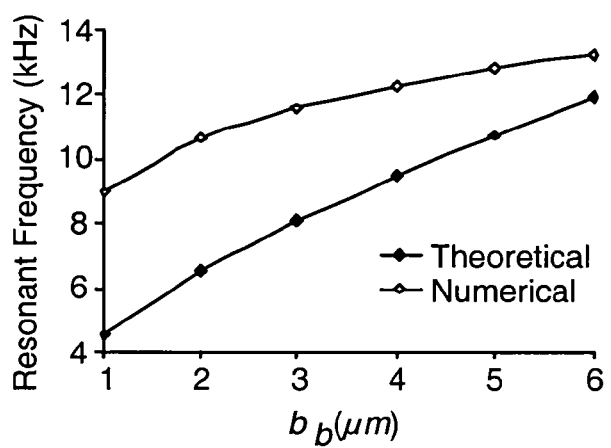
Fig. 8b
Fig. 9
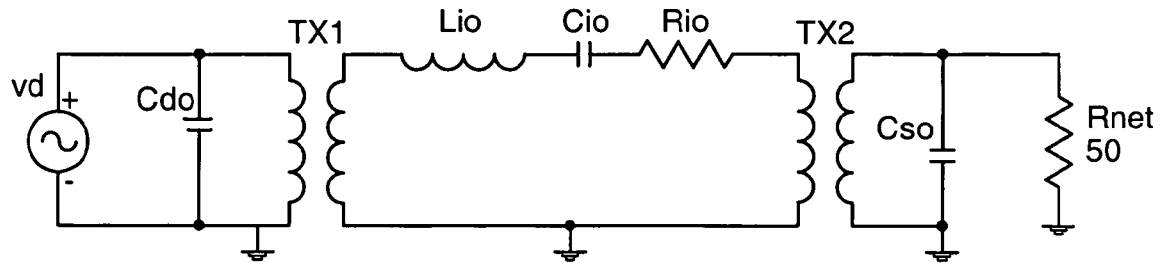

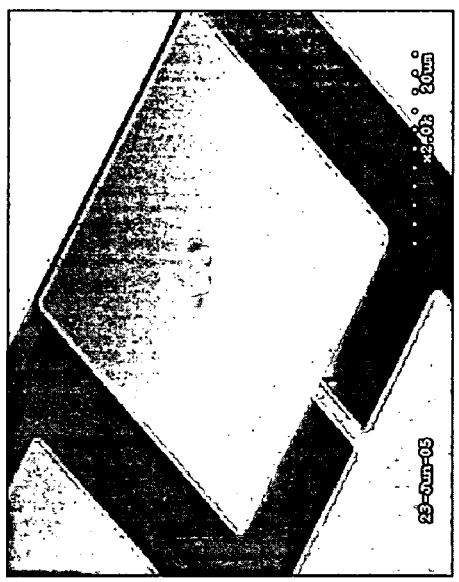
Fig. 11c
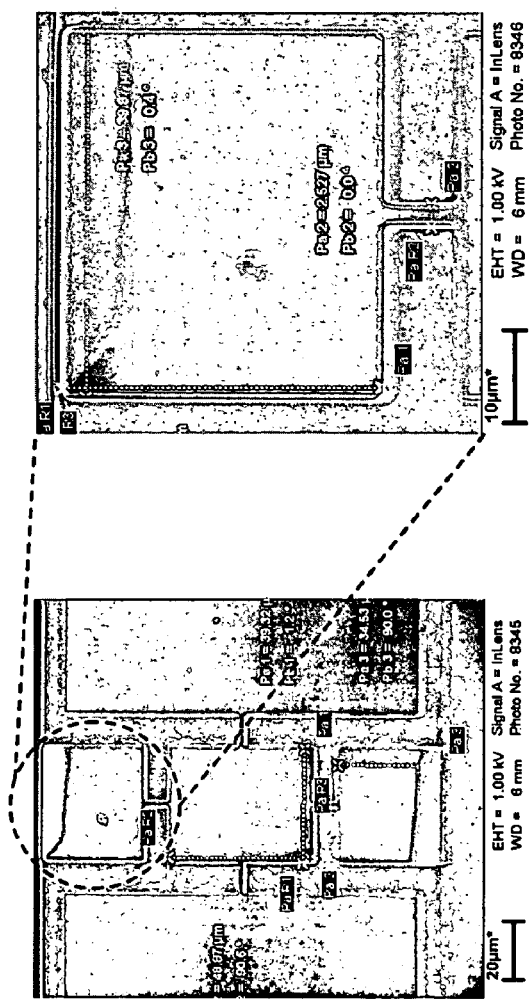
Fig. 11b
Fig. 11a

HIGH-Q LONGITUDINAL BLOCK RESONATORS WITH ANNEXED PLATFORMS FOR MASS SENSING APPLICATIONS

This application claims the benefit of U.S. Provisional Application No. 60/710,713, filed Aug. 23, 2005.

STATEMENT REGARDING FEDERALLY SPONSORED RESEARCH OR DEVELOPMENT

This invention was made in part with government support under Contract Number DAAH01-01-1-R004 awarded by the United States Army. Therefore, the government may have certain rights in this invention.

BACKGROUND

The present invention relates generally to micromachined block resonators, and more particularly, to high-Q longitudinal block resonators with annexed platforms for use in mass sensing applications.

Resonant micro- and nano-cantilevers as mass sensors have demonstrated adsorption-induced stiffness variation, complicating interpretation of experimental results for calculating adsorbed mass from frequency shift. This is discussed by S. Cherian and T. Thundat, in Applied Physics Letters, 80 (2002), pp. 2219-2221, for example. Moreover, cantilevers need to be scaled down to the nanometer range for high sensitivity, imposing fabrication difficulty and long-term stability. This is discussed by A. Gupta, J. Denton, et. al., in J. Microelectromech. Syst., 12, (2003), pp. 185-192, for example. While FBAR-based mass sensors can achieve high sensitivity at micron scale, the dependence of the mass sensitivity on the FBAR design, such as acoustic isolation for separating the vibrations from the substrate, complicates the fabrication processes. This is discussed by R. Gabi, E. Green, et. al., in IEEE Sensors 2003, pp. 1184-1188.

MEMS/NEMS (MicroElectroMechanical Systems or NanoElectroMechanical Systems) based resonators coated with selective binding layers are of great interest for detecting chemical or biological species. This is discussed by P. G. Datskos, et al., in "Micro and Nanocantilever Sensors", Encyclopedia of Nanoscience and Technology, Edited by H. S. Nalwa, American Publishers (2004). They have found numerous potential applications. For instance, they can be used to monitor patients at home, provide tools for life science study, monitor environmental conditions, and contribute to homeland security.

By monitoring its resonant frequency variation, a mechanical resonant structure coated with a particular sensitive binding layer can detect the existence and measure the concentration of a particular target species in the analyte of interest, to be specific, the adsorbed mass of that species. Although this basic concept of species or mass sensing has been demonstrated for a long time, some key technical challenges prevent it from practical applications. For instance, most of the MEMS/NEMS based mass sensors developed so far have utilized a flexural-mode cantilever as the resonant structure. Cantilever-based mass sensors have demonstrated attogram-level sensitivity in vacuum and femtogram-level sensitivity in air. This is discussed by B. Llic, et al., in "Attomgram Detection Using Nanoelectromechanical Oscillators", Journal of Applied Physics, Vol. 95, No. 7, April 2004, pp. 3694-3703, K. L. Ekinci, et al., in "Ultrasensitive Nanoelectromechanical Mass Detection", Applied Physics Letters, Vol. 84, No. 22, May 2004, pp. 4469-4471, and Nickolay V. Lavrik et al., in "Femtogram Mass Detection Using photothermally Actuated Nanomechanical Resonators", Applied Physics Letters, Vol. 82, No. 16, April 2003, pp. 2697-2699. However, their low quality factors (Q) demonstrated in air make them unsuitable for real-world detection. Especially, a higher Q in a resonant mass sensor is desirable in that it translates to a higher signal-to-noise ratio, lower motional resistance for its interface circuit, and a lower minimum detectable mass. This is discussed by Yu-Wei Lin, et al., in "Series-Resonant VHF Micromechanical Resonator Reference Oscillators," Resistance" IEEE Journal of Solid-State Circuits, Vol. 39, No. 12, December 2004, pp. 2477-2491, and K. L. Ekinci, Y et al., in "Ultimate Limits to Inertial Mass Sensing Based Upon Nanoelectromechanical Systems", Journal of Applied Physics, Vol. 95, No. 5, March 2004, pp. 2682-2689. Due to their complicated assembly of photothermal actuation and optical readout disclosed in the Lavrik et al. paper, integration and packaging of cantilever-based sensors present a major bottle block to the implementation of sensor-array configurations.

Besides the above-mentioned challenges, there are other technical issues pertinent to cantilever-based mass sensors. For instance, resonant frequency shift should ideally be caused only by the mass of an absorbed species. However, the adsorption process introduces stiffness variation of a cantilever, and complicates the interpretation of experimental results. This is discussed by G. Y. Chen, et al., "Adsorption-Induced Surface Stress and Its Effects on Resonance Frequency of Microcantilevers", Vol. 77, No. 8, Journal of Applied Physics, April 1995, pp. 3618-3622, and Suman Cherian and Thomas Thundat, in "Determination of Adsorption-Induced Variation in the Spring Constant of a Microcantilever", Applied Physics Letters, Vol. 80, No. 12, March 2002, pp. 2219-2221. Since the same amount of adsorbed mass at different locations along the length of a cantilever has different distributed modal mass, non-uniform adsorption of a target species will further introduce error in experimental measurement. This is discussed by Don L. Devoe, in "Piezoelectric Thin Film Micromechanical Beam Resonators", Sensors and Actuators, Vol. 88, 2001, pp. 263-272.

It would be desirable to have micromachined longitudinal block resonators that have improved sensitivity and reliability.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 1a and 1b illustrate the working principle of a length-extensional mass sensor with annexed sensing platforms, wherein FIG. 1a shows the sensor before absorbing a target species and FIG. 1b shows the sensor after absorbing the target species;

FIGS. 3a and 3b show exemplary two-port configurations of a length-extensional bulk-mode mass sensor with annexed sensing platforms, wherein FIG. 3a shows on-chip integrated capacitive transducers and FIG. 3b shows on-chip integrated piezoelectric transducers;

FIGS. 8a and 8b show a comparison between the theoretical calculated and numerical simulated resonant frequencies;

FIG. 9 shows an equivalent P-SPICE electrical model of the two-port configuration of the capacitive mass sensor shown in FIG. 3a;

FIGS. 11a-11c show SEM pictures of the mass sensor with clusters of nanoparticles loaded on the sensing platforms;

DETAILED DESCRIPTION

Disclosed are high-Q length-extensional mass sensors, featuring both annexed sensing platforms and on-chip integrated transducers. The annexed sensing platforms incorporated into the sensors greatly alleviate the technical issues pertinent to cantilever-based mass sensors. The utilization of the length-extensional bulk-mode vibrations of a resonant microstructure enables the advantages as follows: 1) higher mass sensitivity at a large scale, relative to cantilever-based sensors; 2) high-Q in air; 3) on-chip integrated transducers; and 4) compatibility with sensor array configurations.

Concept

Working Principle

Figure 1A:
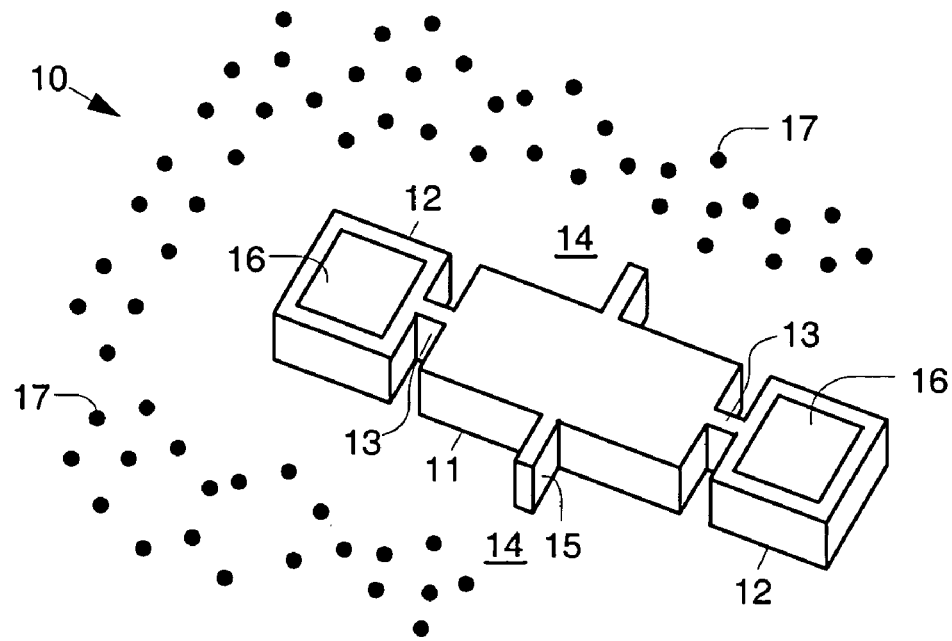
Figure 1B:
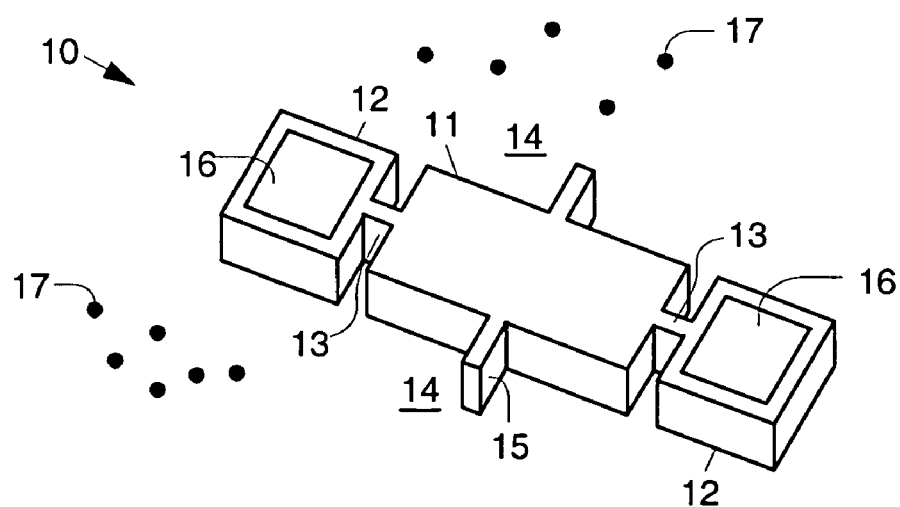
Figure 2A:
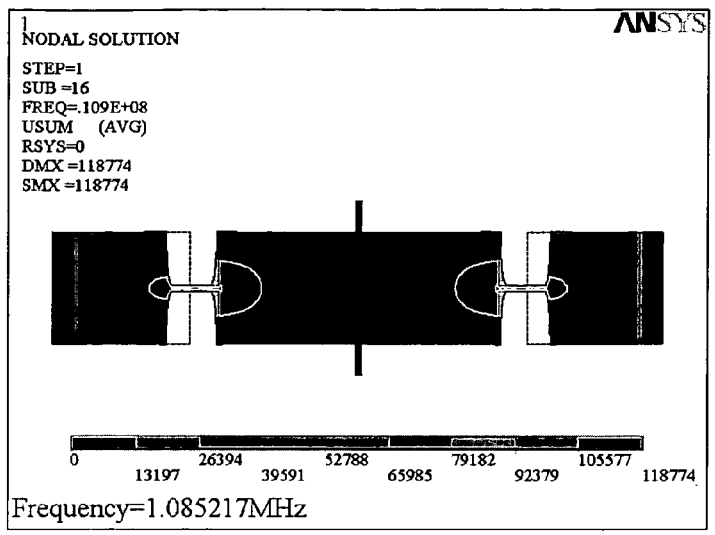
FIGS. 2a-2c illustrate length-extensional bulk-mode vibrations of a resonant microstructure shown in FIGS. 1a and 1b.
Figure 2B:
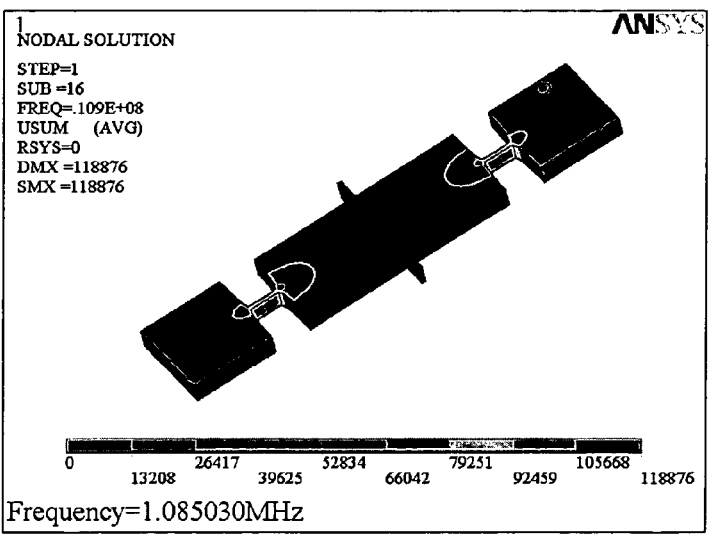
Figure 2C:
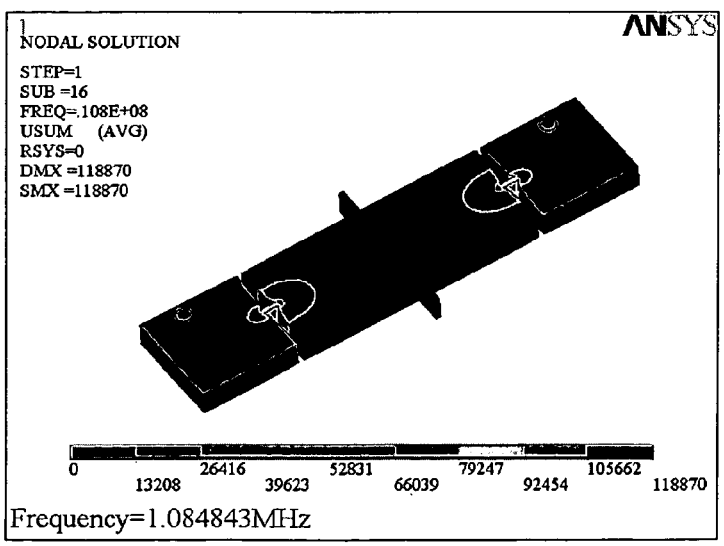

Referring to the drawing figures, FIGS. 1a and 1b illustrate the working principle of a length-extensional mass sensor 10 with annexed sensing platforms 12, wherein FIG. 1a shows the sensor 10 before absorbing a target species 17 and FIG. 1b shows the sensor 10 after absorbing the target species 17. As shown in FIGS. 1a and 1b, the mechanical resonant structure of a length extensional mass sensor 10 is comprised of a central block 11 and two sensing platforms 12 annexed to the block 11 by way of separation beams 13. This resonant structure is suspended from a substrate 14 by two support beams 15. A selective binding layer 16 is disposed (coated) on top of the two annexed sensing platforms 12. Symmetric about a central line of its support beams 14, the resonant microstructure operates in a length-extensional bulk-mode, as illustrated in FIGS. 2a-2c. From its bulk-mode vibrations, this microstructure lends itself to high-Q in air, a key factor determining practical applications and performance merits of a mass sensor 10.

FIGS. 2a-2c illustrate length-extensional bulk-mode vibrations of a resonant microstructure shown in FIGS. 1a and 1b showing translation motion in the annexed sensing platforms 12. FIG. 2a shows the mode shape without mass loading. FIG. 2b shows the mode shape with a loaded mass of 26.35 pg on one platform 12. FIG. 2c shows the mode shape with a total loaded mass of 52.7 pg on both platforms 12. The legend shows the resonant displacement distribution across the resonant structure and the solid line denotes the undeformed shape.)

Initially, the resonant structure with the selective binding layer 16 vibrates at its original resonant frequency, $f_o$. Once a target species appears in the analyte under test, the binding layer 16 will adsorb the species 17 and give rise to a lower resonant frequency, $f_s$. By measuring resonant frequency shift, $\Delta f = f_o - f_s$, this mass sensor monitors mass loading, $\Delta m$, from species adsorption.

Annexed Sensing Platforms

As illustrated in FIGS. 2a-2c, by introducing slim separation beams 13 into the resonant microstructure, the deformation in the annexed sensing platforms 12 is greatly alleviated, compared to that in a rectangular block or beam, and results in a translational-dominant motion. Therefore, species 17 absorption on the platforms 12 has much less effect on the equivalent modal stiffness ($\Delta k \sim 0$), and mass loading becomes the main mechanism for the shift in resonant frequency. This is verified by numerical simulation results. As shown in FIGS. 2a-2c, the frequency shift is proportional to the loaded mass.

Due to the near-uniform motion of the platforms 12, especially in areas sufficiently away from the separation beams 13, the adsorbed species 17 across the platforms 12 has the same distributed modal mass, and hence non-uniform adsorption does not complicate the interpretation of experimental results. Moreover, since the annexed platforms 12 experience the maximum vibration amplitude in the whole structure, the adsorbed species introduces the largest distributed modal mass and maximizes the shift in resonant frequency of the device.

On-Chip Integrated Transducers

Figure 3A:
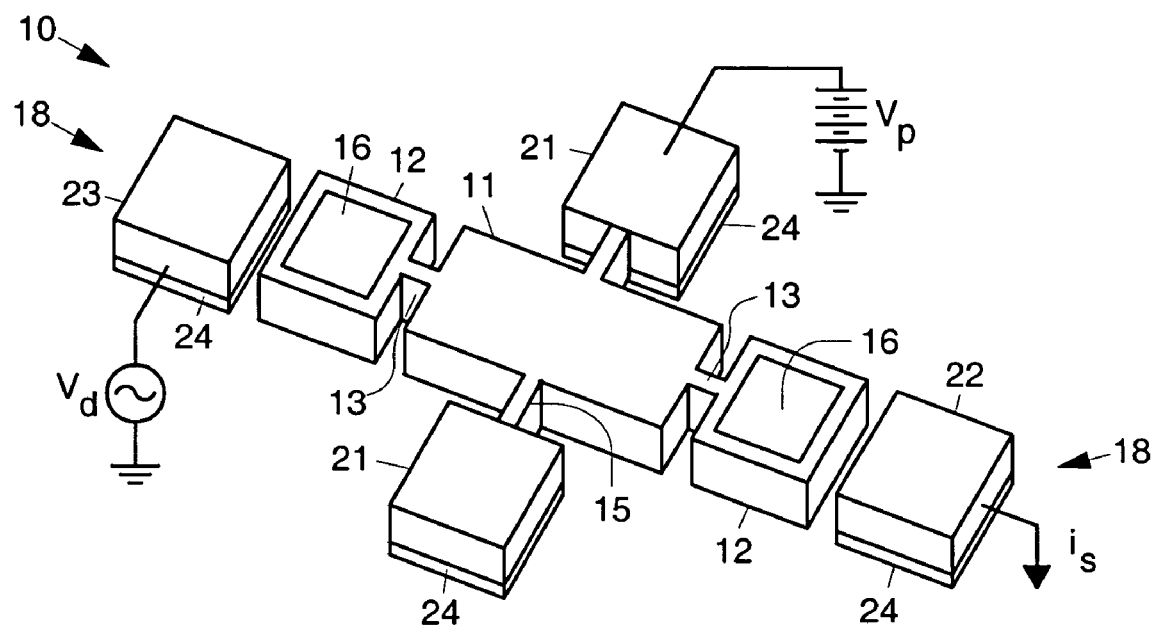
Figure 3B:
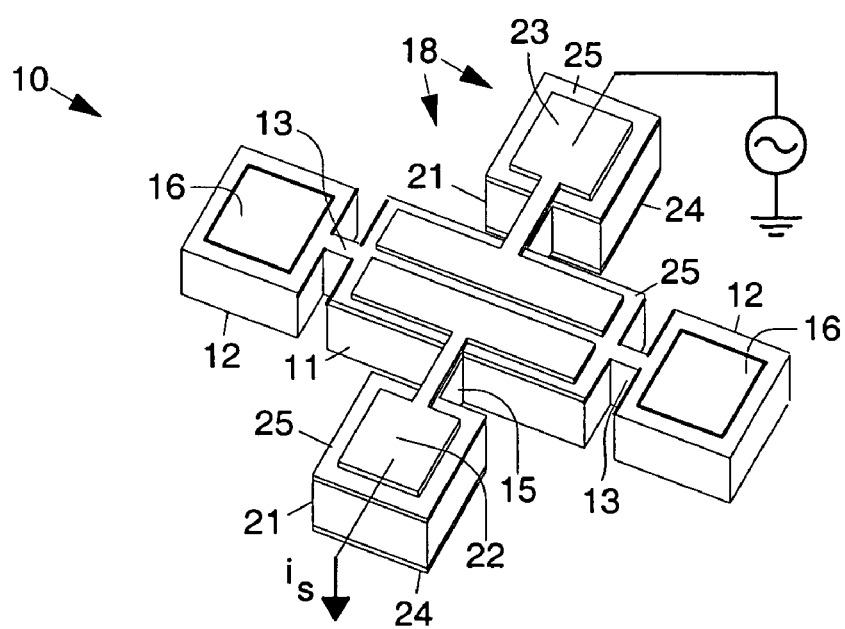

Referring to FIGS. 3a and 3b, they show exemplary two-port configurations of a length-extensional bulk-mode mass sensor 10 with annexed sensing platforms 12, wherein FIG. 3a shows on-chip integrated capacitive transducers 18 and FIG. 3b shows on-chip integrated piezoelectric transducers 18. More particularly, the mass sensor 10 shown in FIG. 3a implements a capacitive drive and sense scheme. The mass sensor 10 shown in FIG. 3b implements piezoelectric drive and sense scheme.

As is shown in FIG. 3a, the mass sensor 10 comprises a central longitudinal block 11 that is coupled (clamped or attached) along a lateral axis by way of two support beams 15 to two lateral anchors 21. The longitudinal block 11 is coupled along an orthogonal longitudinal axis by way of two slim separating beams 13 to two annexed platforms 12. A selective binding layer 16 is disposed (coated) on top of the two annexed sensing platforms 12. The resonant structure of the mass sensor 10 comprises the longitudinal block 11, the two lateral anchors 21 and support beams 15, the two annexed platforms 12, and the separating beams 13. One annexed platform 12 is coupled to a sense electrode 22. The other annexed platform 12 is coupled to a drive electrode 23. The sense and drive electrodes 22, 23 shown in FIG. 4a comprise a capacitive drive and sense scheme. The drive electrode 23 is operative to resonant vibrations. The sense electrode 22 is operative to sense motion of the longitudinal block 11. An insulating material 24, such as buried oxide 24 is disposed on bottom surfaces of the sense and drive electrodes 22, 23 and the lateral anchors 21 that insulate them from an underlying substrate 14, which may be silicon, for example.

As is shown in FIG. 3b, the mass sensor 10 comprises a longitudinal block 11 that is coupled (clamped or attached) along one axis to two lateral anchors 21 by way of two support beams 15. The longitudinal block 11 is coupled along an orthogonal longitudinal axis to two annexed platforms 12 by way of two slim separating beams 13. A selective binding layer 16 is disposed (coated) on top of the two annexed sensing platforms 12. The resonant structure of the mass sensor 10 comprises the longitudinal block 11, the lateral anchors 21, the support beams 15, the annexed platforms 12, and the two separating beams 13. An insulating material 24, such as buried oxide 24, is disposed on bottom surfaces of the two lateral anchors 21 that insulate them from an underlying substrate 14. A piezoelectric layer 25, such as zinc oxide, for example, is disposed on top surfaces of the longitudinal block 11 and lateral anchors 21. Conductive electrodes 22, 23, such a aluminum, for example, are disposed on top surfaces of the longitudinal block 11 and piezoelectric layer 25 which comprise a piezoelectric drive and sense scheme. The drive electrode 23 is operative to resonant vibrations. The sense electrode 22 is operative to sense motion of the longitudinal block 11.

As is illustrated in FIG. 3a, the mass sensor 10 can be operated with on-chip integrated capacitive transducers 18 with a two-port configuration. The resonant microstructure is connected to a DC polarization voltage ($V_p$). An AC voltage ($V_d$) is applied to the drive electrode, while a sensing current ($i_s$) is detected from the sense electrode. Capacitive transducers are used to demonstrate the proof of concept.

Alternatively, the mass sensor 10 can be operated with on-chip integrated piezoelectric transducers 18, as shown in FIG. 3b. Compared with their capacitive counterpart, piezoelectric transducers 18 do not need a DC polarization voltage for resonant operation and provide large electromechanical coupling, further easing its interface circuit design. Since the resonant microstructure is not necessary to be conductive for its piezoelectric transducers, 18 this feature lends itself to higher compatibility with various bio-sensitive materials than capacitive transducers 18.

Design and Modeling

Length-Extensional Bulk-Mode Vibrations

Figure 4:
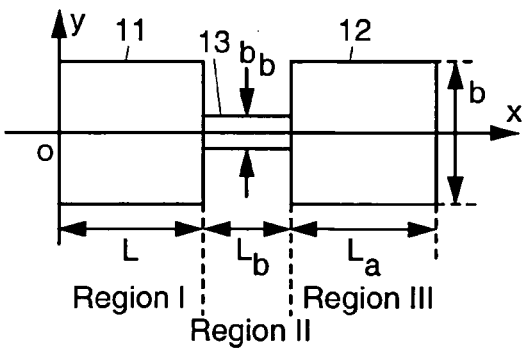
FIG. 4 shows geometrical design parameters of half of the symmetric resonant microstructure and coordinates used for analysis.

The length-extensional bulk-mode vibrations of the mass sensor 10 will now be discussed. FIG. 4 shows geometrical design parameters of half of the symmetric resonant microstructure and coordinates used for analysis. The microstructure includes three regions, identified as Region I: half of the central block 11; Region II: separating beam 13; and Region III: sensing platform 12.

Figure 5A:
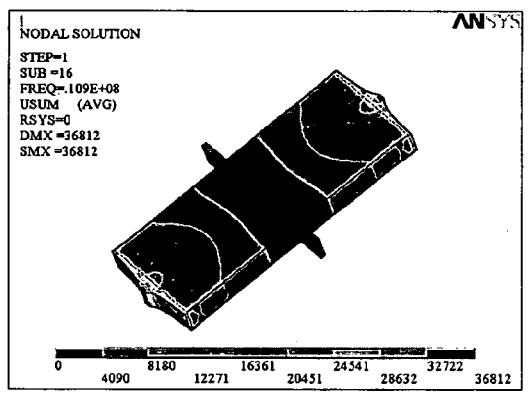
FIGS. 5a-5c show close-up views of modal displacement distribution in different regions of the microstructure.
Figure 5B:
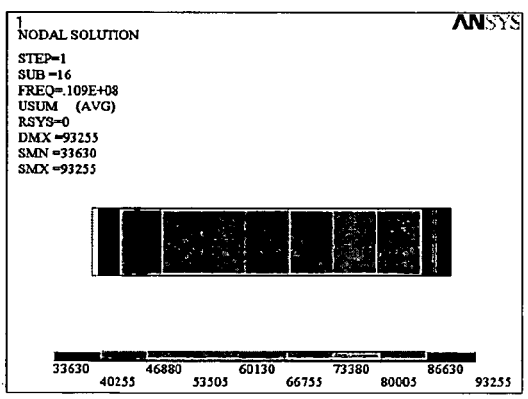
Figure 5C:
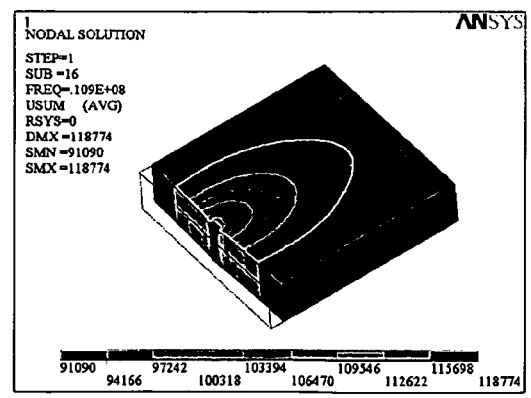

Close-up views of modal displacement distribution in different regions of the microstructure are illustrated in FIGS. 5a-5c. The deformation mainly exists in the central block 11 and the separating beams 13. While it undergoes longitudinal deformation, the function of the separating beam 13 is to prevent the longitudinal elastic waves in the central block 11 from propagating into the annexed sensing platforms 12.

Therefore, the equivalent modal stiffness, k, of the length-extensional vibrations is from the central block 11 and the separating beams 13. The annexed platforms 12 undergo primarily translational-motion while suffering slightly deformation in the area close to the separating beams 13. Because the annexed platforms 12 experience the maximum vibration amplitude, it is reasonable to consider that the equivalent modal mass, M, is mainly from them.

Figure 6:
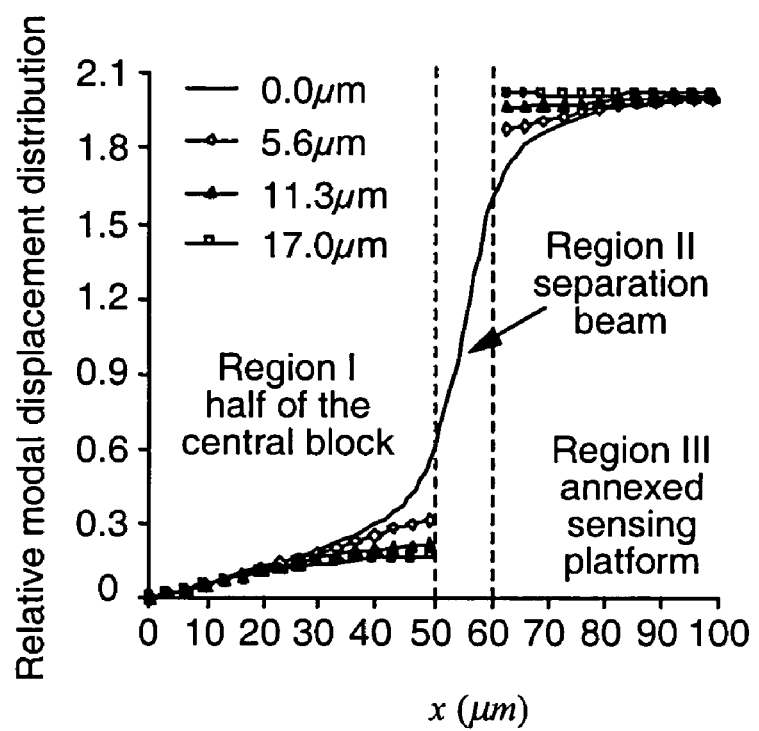
FIG. 6 shows a modal displacement distribution along the x-axis of the resonant microstructure.

Simulated in ANSYS/Multiphysics, FIG. 6 shows a modal displacement distribution along the x-axis of the resonant microstructure, with different distances from the x-axis. The slope of the tangent along each solid line indicates the level of deformation. Consider the modal displacement distribution at y=0.0 µm (the x-axis). The separating beams 13 undergo the most deformation from its sharp slope, while the annexed sensing platform 12 experiences trivial deformation but mainly translational motion. Especially, as the location in the annexed platform 12 is away from the x-axis, the slope of the tangent gets flatter, indicating that the deformation in that area is even smaller. This feature is important because it means that adsorption of a target species will not vary the equivalent modal stiffness of the mass sensor 10 but its equivalent modal mass only.

Figure 7:
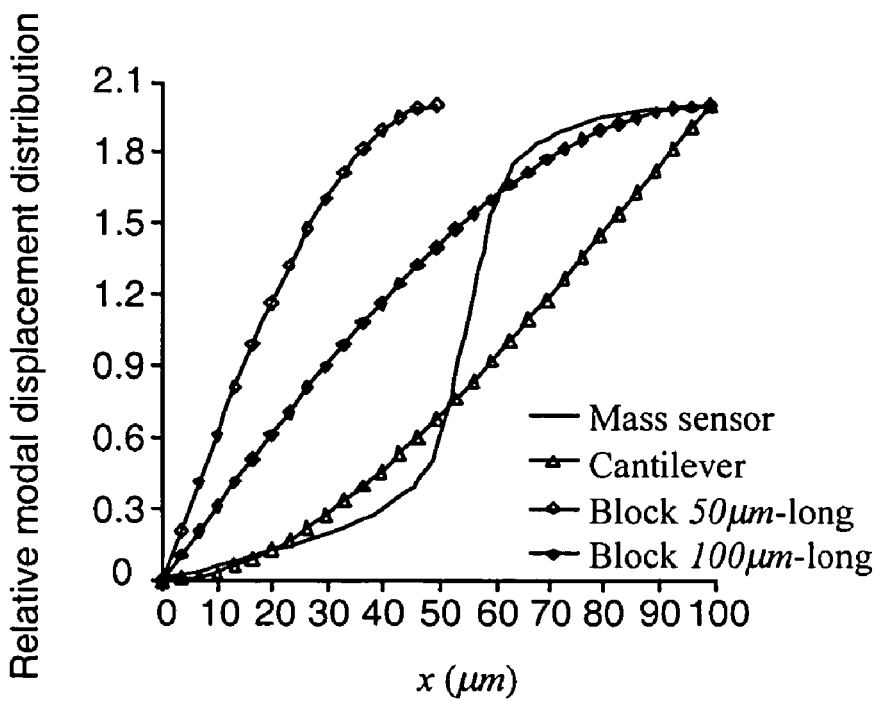
FIG. 7 shows a comparison of the modal displacement distribution along the length of the structures used for mass sensing.

A comparison of the modal displacement distribution along the length of the structures used for mass sensing is illustrated in FIG. 7. The equivalent distributed modal mass of the adsorbed species at the location, x, is written as:

$$m(x) = m_s \cdot \phi(x) \qquad (1)$$

where $m_s$ and $\phi(x)$ denote the adsorbed mass and modal displacement at the location, x.

Based on the above equation, the equivalent distributed modal mass of the same amount of adsorbed mass can vary from zero at x=0 to twice of its physical value at the edge of either a cantilever or a rectangular block. Thus, the nonuniform adsorption of a target species 17 on such types of resonant structures will complicate the interpretation of the adsorbed mass. In contrast, the adsorbed species across the platforms 12 has the same contribution to the equivalent distributed modal mass, greatly alleviating the non-uniform absorption of any species 17.

As may be observed from FIGS. 5a-5c, a 2-D effect is noticeable due to the different cross-sections in the microstructure. For simplicity, this effect will be neglected to derive a simple expression for providing design guidance for initial design parameters and rough predictions. Since the resonant frequency is a critical design parameter for the mass sensor 10, numerical simulation are used to provide accurate prediction and further refine the design parameters. A numerical simulation is inevitable for taking two-dimensional (2-D) effect into account.

Since the sensing platform 12 undergoes negligible deformation, the 1-D governing equation for the length-extensional bulk-mode vibrations in the microstructure may be expressed as:

$$E \cdot A_C \frac{\partial^2 u}{\partial x^2} = \tilde{n} \cdot A_C \cdot \frac{\partial^2 u}{\partial t^2} \quad \text{Region } I: x = 0, L \qquad (2)$$

$$E \cdot A_b \frac{\partial^2 u}{\partial x^2} = \tilde{n} \cdot A_b \cdot \frac{\partial^2 u}{\partial t^2} \quad \text{Region } II: x = L, (L + L_b)$$

where E and ρ denote Young's modulus and density of the resonant structure's material, respectively; $A_b = b_b \cdot h$ and $A_c = b \cdot h$ denote the cross-section areas of the separation beam 13 and the central block 11, respectively.

When the resonator undergoes time-harmonic vibrations, it can be assumed that:

$$u(x,t) = U_0(x) \cdot e^{i\omega \cdot t} \qquad (3)$$

where ω denotes the angular resonant frequency.

By using the boundary condition at x=0, requiring that the displacement be zero, the solution to Region I may be written as:

$$U_c = U_{c0} \cdot \sin(c \cdot x) \text{Region I} \qquad (4)$$

where $c = \omega/\sqrt{E/\rho}$ and $U_{c0}$ is the vibration amplitude in Region I The solution to Region II may be written as:

$$U_b = U_{b1} \cdot \cos(c \cdot x) + U_{b2} \cdot \sin(c \cdot x) \text{Region II} \qquad (5)$$

where $U_{b1}$ and $U_{b2}$ are the vibration amplitudes in Region II.

For Region II, the boundary condition at x=L+Lb requires that the normal force be equal to the acceleration of the mass of the annexed sensing platform 12:

$$-m_a \cdot U_b \cdot \omega^2 = E \cdot A_b \cdot \frac{\partial U_b}{\partial x} \quad (6)$$

where $m_a = \rho \cdot L_a \cdot b \cdot h$ is the physical mass of the annexed sensing platform 12.

The boundary condition at $x=L$ requires that the normal force and the longitudinal displacement from the central block 11 be equal to the corresponding values from the separation beam 13:

$$U_c = U_b \quad (7a)$$

$$A_c \frac{\partial U_C}{\partial x} = A_b \frac{\partial U_b}{\partial x} \quad (7b)$$

The combination of Equations (6) and (7) yields the expression for the following relation:

$$\begin{bmatrix} a_{11} & a_{12} & a_{13} \\ a_{21} & a_{22} & a_{23} \\ a_{31} & a_{32} & a_{33} \end{bmatrix} \cdot \begin{bmatrix} U_{c0} \\ U_{b1} \\ U_{b2} \end{bmatrix} = 0 \quad (8)$$

where the matrix is associated with the geometrical parameters and the physical properties of the structural material used.

In order to obtain nontrivial solutions to $U_{c0}$, $U_{b1}$, and $U_{b2}$, the determinant of the matrix in Equation (8) must be set to zero. It is the eigenvalue causing the determinant to vanish that corresponds to the resonant frequency of the bulk-mode vibrations of the microstructure. Therefore, the eigenvalue equation for the resonant frequency can be expressed as:

$$\omega = -\sqrt{E \cdot \rho} \cdot \frac{A_b}{m_a} \cdot \frac{\left[\tan(cL_b) + \frac{1}{1-\gamma_A}[\gamma_A \cdot [\tan(cL)] + ctg(cL)]\right]}{1 - \frac{\tan(cL_b)}{1-\gamma_A}[\gamma_A \cdot [\tan(cL)] + ctg(cL)]} \quad (9)$$

where $\gamma_A = A_b/A_c$ denotes the ratio of the cross-section area of the separation beam 13 to that of the central block 11.

By expanding tangent and cotangent functions into series and neglecting higher orders $(c \cdot L_b)^2$ and $(c \cdot L)^2$, Equation (9) can be simplified as:

$$f_{th} = \frac{1}{2\pi} \cdot \sqrt{\frac{A_b}{L} \cdot \frac{E}{m_a} \cdot \frac{1}{(1-\gamma_A) \cdot \left[1 - \frac{\gamma_L}{1-\gamma_A}\right]}} \quad (10)$$

where $f_{th}$ is the theoretical resonant frequency and $\gamma_L = L_b/L$ is the ratio of the length of the separation beam 13 to half the length of the central block 11.

FIGS. 8a and 8b show a comparison between the theoretical calculated and numerical simulated resonant frequencies. FIG. 8a shows the resonant frequency versus the sensing platform length ($L_s$) for a microstructure (L=10 µm, b=10 µm, $L_b$=2 µm, and $b_b$=1 µm), and FIG. 8b shows the resonant frequency versus the width of the separation beams ($b_b$) of a microstructure (L=50 µm, b=40 µm, $L_b$=4 µm, $L_a$=50 µm, and $b_b$=1 µm)

As illustrated in FIG. 8a, the resonant frequency decreases with the length of the annexed platform 12, while it increases with the width of the separation beam 13. From the frequency difference between the theoretical and numerical calculations, numerical simulation is necessary to provide accurate performance prediction. However, according to the theoretical derivation, the width of separation beams 13, the length of the central block 11, and the mass of the annexed platform 12 are identified as the main design parameters for this mass sensor 10. By varying them, different types of mass sensors can be designed to meet different performance specifications.

Equivalent Lumped-Element Model

The equivalent modal stiffness of the device can be obtained using two numerical simulations. As shown in FIG. 2a, the first simulation is to calculate the original resonant frequency, expressed as:

$$f_O = \frac{1}{2\pi} \cdot \sqrt{\frac{k}{M}} \quad (11)$$

Given in either FIG. 2b or 2c, the second simulation gives rise to the resonant frequency with a known adsorbed mass, $\Delta m$:

$$f_S = \frac{1}{2\pi} \cdot \sqrt{\frac{k}{M + \Delta m}} \quad (12)$$

Through combining Equations (11) and (12), the accurate equivalent modal stiffness of this mass sensor 10 can be obtained using the following expression:

$$k = 2\pi^2 \cdot f_O^3 \cdot \frac{\Delta m}{\Delta f} \quad (13)$$

Then, the equivalent modal mass of the mass sensor 10 can be written as:

$$M = \frac{k}{(2\pi f_o)^2} = 2 \cdot \lambda_{eff} \cdot \rho \cdot L_a \cdot b \cdot h \quad (14)$$

where $\lambda_{eff}$ is a coefficient, which is larger than the value of 1 and can be determined from numerical simulation. The dynamic vibration behavior of the microstructure can be described by an equivalent lumped-element model:

$$M \frac{d^2 x}{dt^2} + D \cdot \frac{dx}{dt} + k \cdot x = F_e \quad (15)$$

where D is the damping coefficient, which is determined by experiment. The capacitive force, denoted by F, is from the on-chip integrated capacitive transducers 18.

Capacitive Transducers

With the assumption of a parallel-plate model, which neglects the fringing effect, the capacitive force with the resonant frequency, ω, applied to the two ends of the sensing platforms 12 can be calculated as below:

$$F_d = -\frac{C_{do}}{d_d} \cdot V_p \cdot v_d + C_{do} \cdot \frac{V_p^2}{d_{do}^2} \cdot u \quad (16a)$$

$$F_s = C_{so} \cdot \frac{V_p^2}{d_{so}^2} \cdot u \quad (16b)$$

where $F_d$ and $F_s$, denote the terms from the drive electrode and sense electrode, respectively; and $v_d$ is an ac voltage of frequency, ω. $C_{do}$ and $C_{so}$ are the static capacitances of the drive and sense electrodes 23, 22, respectively.

Electro-Mechanical Coupling

Incorporating the capacitive force into Equation (15) leads to the expression modeling electromechanical coupling behavior of the mass sensor 10:

$$M\frac{d^2 x}{dt^2} + D \cdot \frac{dx}{dt} + (k - k_e) \cdot x = -\frac{C_{do}}{d_d} \cdot V_p \cdot v_d \quad (17)$$

where the term at the right side of the equation is the driving force, and $k_e$ is the electrostatic stiffness, expressed as below:

$$k_e = \frac{V_p^2}{d_{do}^2} \cdot C_{do} + \frac{V_p^2}{d_{so}^2} \cdot C_{so} \quad (18)$$

Therefore, taking electrostatic stiffness into account, the resonant frequency of the capacitive mass sensor 10 is calculated as:

$$f_{tune} = f_o \cdot \sqrt{1 - \frac{k_e}{k}} \quad (19)$$

To aid in the design and analysis of the device, an admittance model is derived, by combining the capacitive equations with the second-order equation of the resonant microstructure. The overall transfer function describing the admittance, $Y_{sd}$, between the drive electrode 23 (input) and sensed electrode 22 (output) of the mass resonator depicted in FIG. 3a is defined by:

$$Y_{sd}(j\omega) = \frac{i_s(j\omega)}{v_d(j\omega)} \quad (20)$$

where $v_d$ is the drive voltage, and $i_s$ the current measured at the sense electrode 22.

Equation (20) can also be expressed as the product of the mechanical force-displacement transfer function for the microstructure, $x(j\omega)/F(j\omega)$, the electromechanical coupling at the input, $\eta_d = F(j\omega)/v_d(j\omega)$, and the electromechanical coupling at the output port, $\eta_s(j\omega) = i_s(j\omega)/[j\omega \cdot x(j\omega)]$. Therefore, Equation (20) can be rewritten as:

$$Y_{sd}(j\omega) = \frac{x(j\omega)}{F(j\omega)} \cdot \frac{F(j\omega)}{v_d(j\omega)} \cdot \frac{i_s(j\omega)}{x(j\omega)} = j\omega \cdot \eta_d \cdot \eta_s \cdot \frac{x(j\omega)}{F(j\omega)} \quad (21)$$

While Equation (17) can be written in the following format:

$$\frac{k(j\omega)}{F(j\omega)} = \frac{1}{\frac{j\omega}{\omega^2} + \frac{1}{\omega \cdot Q} + (1 - k_e/k) \cdot \frac{1}{j\omega}} \quad (22)$$

Based on the above equations, an equivalent electrical model describing the dynamic behavior of the two-port configuration of the capacitive mass sensors 10 is illustrated in FIG. 9. FIG. 9 shows an equivalent P-SPICE electrical model of the two-port configuration of the capacitive mass sensor shown in FIG. 3a. Its corresponding equivalent inductance ($L_{io}$), motional resistance ($R_{io}$), and equivalent capacitance ($C_{io}$) can be expressed as below:

$$L_{io} = \frac{(k - k_e) \cdot d_{do} \cdot d_{so}}{C_{do} \cdot C_{so} \cdot V_p^2 \cdot (2\pi \cdot f_{tune})^2} \quad (23a)$$

$$R_{io} = \frac{\sqrt{(k - k_e) \cdot (M + \Delta m)} \cdot d_{do} \cdot d_{so}}{C_{do} \cdot C_{so} \cdot V_p^2 \cdot Q} \quad (23b)$$

$$C_{io} = \frac{C_{do} \cdot C_{so} \cdot V_p^2}{d_{do} \cdot d_{so} \cdot (k - k_e)} \quad (23c)$$

where $TX_1$, and $TX_2$ denote the coupling of the drive side and the sense side, respectively, which are both equal to 1. $R_{net}$ is the resistor of 50Ω in a network analyzer, which is connected to the mass sensor 10 for performance characterization.

According to Equation (23b), a high quality factor is critical for reducing the motional resistance of the mass sensor 10. Correspondingly, a high resonant sense current going through the mass sensor 10 can be expected:

$$i_s = Q \cdot 2\pi \cdot f_{tune} \cdot \frac{V_p^2}{k - k_e} \cdot \frac{C_{do} \cdot C_{so}}{d_{do} \cdot d_{so}} \cdot v_d \quad (24)$$

The vibration amplitude at the end of the annexed sensing platform 12 is calculated as:

$$q = \frac{Q}{M \cdot (2\pi \cdot f_{tune})^2} \frac{C_{do}}{d_{do}}; V_p \cdot v_d \quad (25)$$

Figures of Merit

The mass sensitivity ($S_m$) of this device can be expressed as:

$$S_m = \frac{\Delta f}{\Delta m} = \frac{f_0}{4\rho \cdot b \cdot h \cdot L_s \cdot \lambda_{eff}} \quad (26)$$

According to Equation (26), by varying the length ($L_s$) of the annexed sensing platform 12, this design can cover a large range of mass sensitivity within one single sensor-array chip.

The theoretical minimum detectable mass ($\Delta m_{min}$) of this mass sensor 10 may be expressed as:

$$\Delta m_{min} = \frac{\sqrt{4k_b \cdot T \cdot B}}{x} \sqrt{\frac{2\rho \cdot b \cdot h \cdot L_S \cdot \lambda_{eff}}{Q \cdot (2\pi)^3 \cdot f_0^3}} \quad (27)$$

where $k_b$ and T denote the Boltzman constant and the environment temperature, respectively; B is Bandwidth; and q is the vibration amplitude. Both a high-Q and a large vibration amplitude help reduce the $\Delta m_{min}$.

With the known design and operation parameters, k, $k_e$, and $f_{tune}$, and the measured parameter, $f_s$, the actual loaded mass, $\Delta m$, can be calculated using the following relation:

$$\Delta m = \frac{1}{(2\pi)^2} \cdot (k - k_e) \cdot \left[ \frac{1}{f_s^2} - \frac{1}{f_{tune}^2} \right] \quad (28)$$

Experimental Verification

Experimental Procedure

Figure 10A:
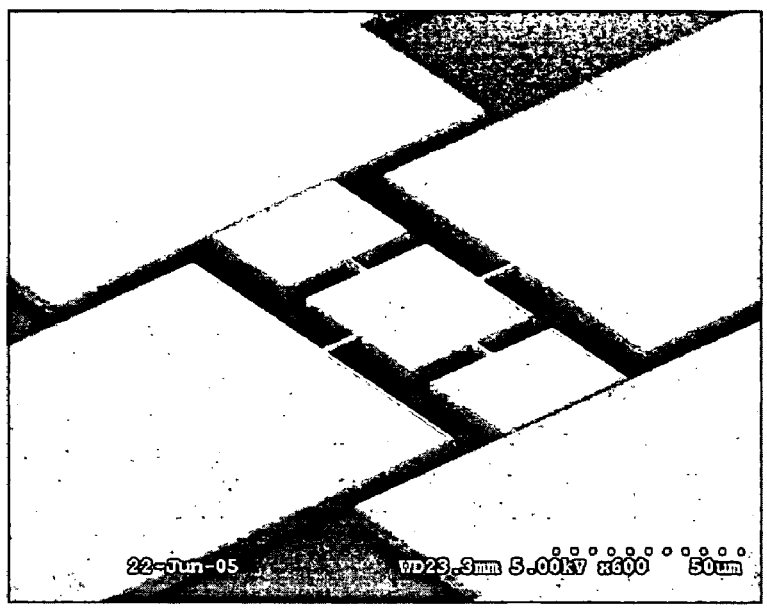
FIG. 10 shows SEM pictures of a mass sensor with the capacitive gaps in the range of 600 nm.
Figure 10B:
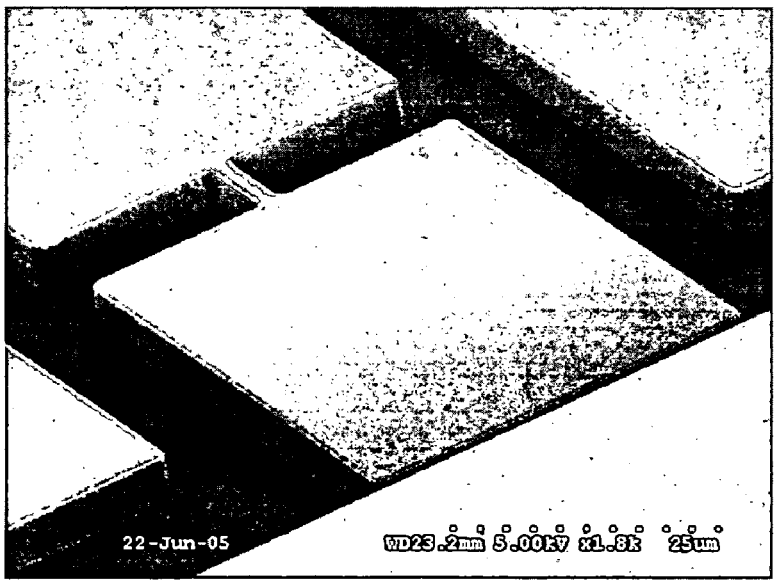

The length-extensional capacitive mass sensors 10 with on-chip integrated capacitive transducers 18 have been fabricated on a 4.3 μm-thick SOI (silicon-on-insulator) wafer using a one-mask fabrication process. Exemplary one-mask fabrication processes are disclosed by Reza Abdolvand and Farrokh Ayazi, in "A Gap Reduction and Manufacturing Technique for Thick Oxide Mask Layers with Multiple-Size Sub-Micron Openings," to be published in Journal of Microelectromechanical Systems, and in "Single-Mask Reduced-Gap Capacitive Micromachined Devices," Proc. IEEE MicroElectro Mechanical Systems Conference (MEMS2005), Miami, Fla., 2005, pp. 151-154, for example. FIG. 10 shows SEM pictures of length-extensional capacitive mass sensors 10 with the capacitive gaps in the range of 600 nm.

To evaluate the performance of this mass sensor 10, certain amount of nanoparticles (Ceria from nGimat Co., diameter<20 nm) was placed on its annexed platforms 12, using a very fine probe tip (radius=2.5 μm) under a microscope. This has the same effect as mass loading due to species adsorption. FIGS. 11a-11c show SEM pictures of the mass sensor 10 with clusters of nanoparticles loaded on the sensing platforms 12.

Figure 12A:
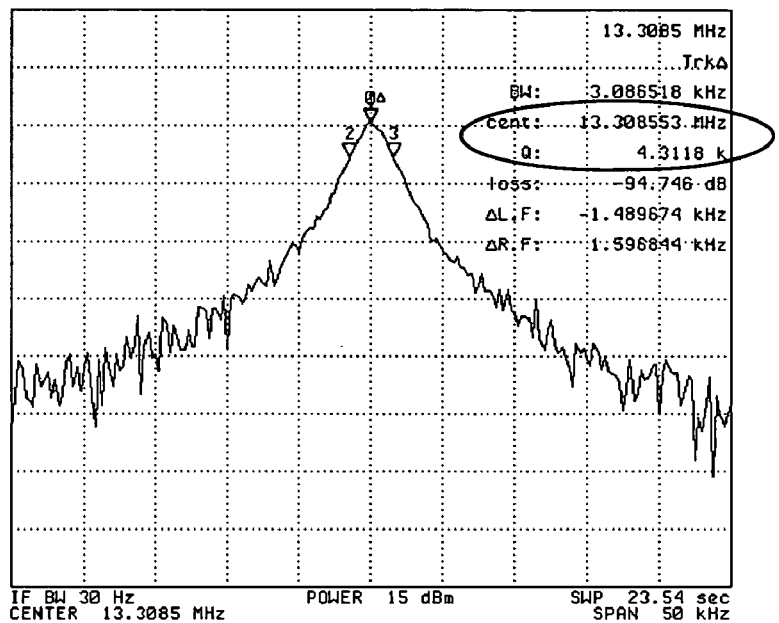
FIGS. 12a and 12b are graphs showing resonant frequencies of the mass sensor measured before and after mass loading.
Figure 12B:
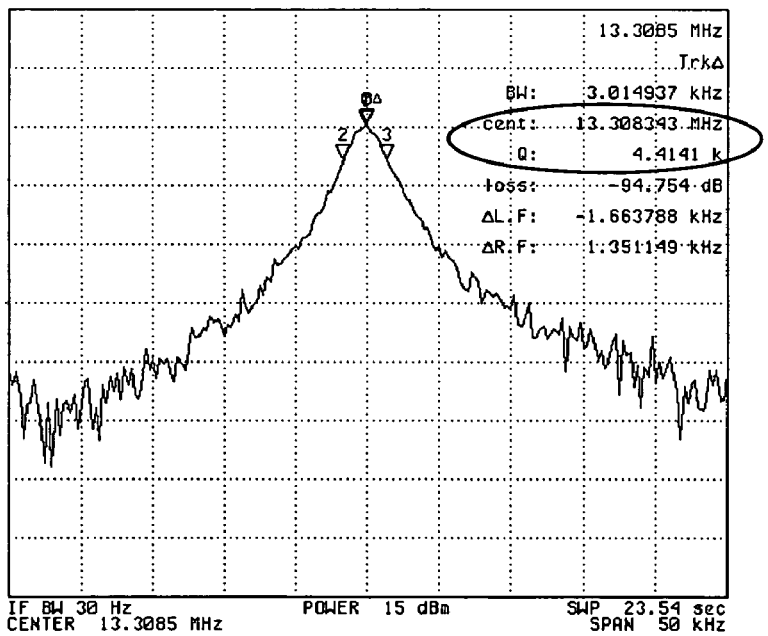
Figure 13A:
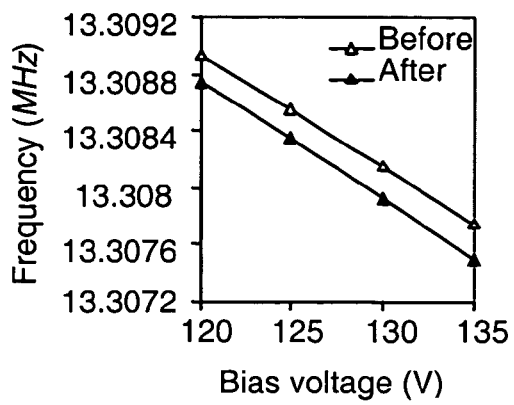
FIGS. 13a, 13b, 14a, 14b, 15a, 15b, 16a and 16b are graphs that show measured resonant frequency shifts at various bias voltages and different loaded mass of exemplary mass sensors.
Figure 13B:
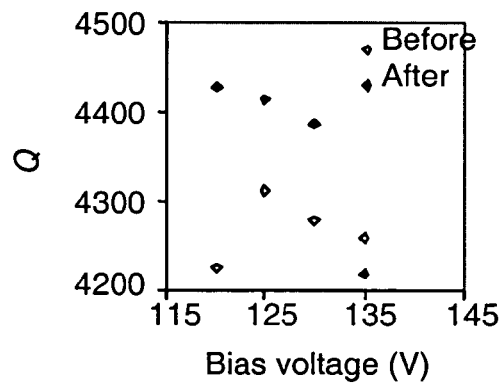
Figure 14A:
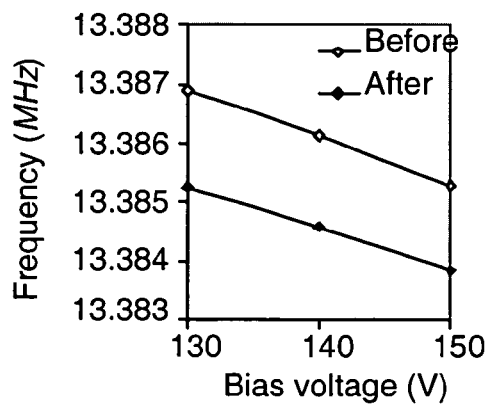
Figure 14B:
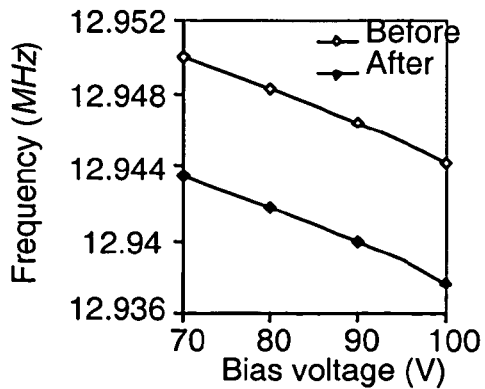
Figure 15A:
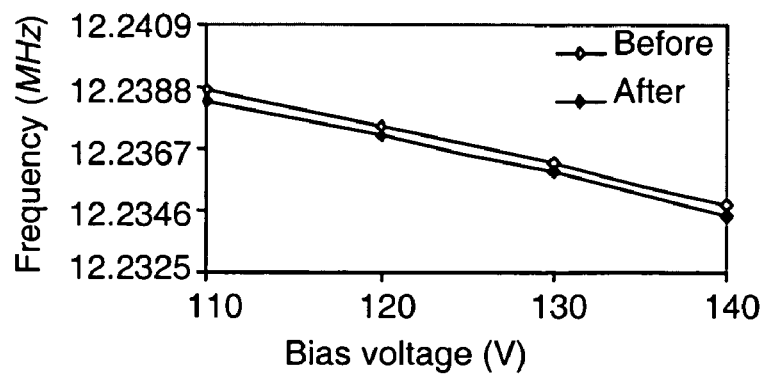
Figure 15B:
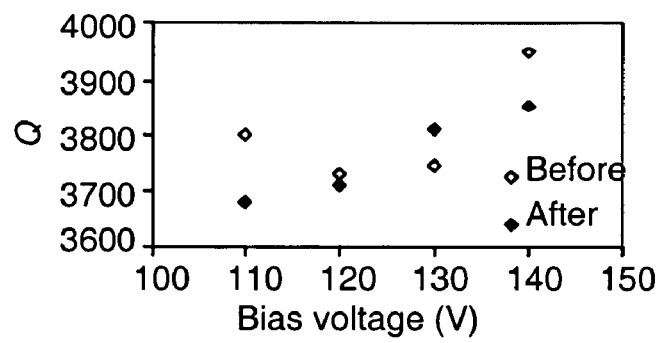
Figure 16A:
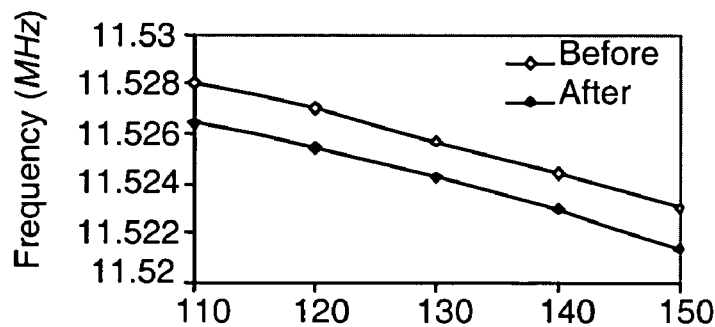
Figure 16B:
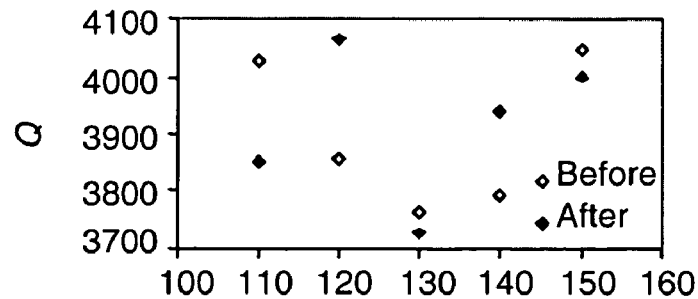

To measure the mass sensitivity of this device, the resonant frequencies of the mass sensor 10 were measured before and after mass loading, as illustrated in FIGS. 12a and 12b, where the resonant frequency decreases due to a mass load of ~1 pg. At the top right corner of FIGS. 12b and 12c is the insertion loss between the input and the output (before $R_{net}$). From this loss, the measured motional resistance of a mass sensor 10 can be expressed as:

$$R_{measured} = 50 \cdot 10^{Loss/20} \quad (29)$$

Experimental Results

FIGS. 13a, 13b, 14a, 14b, 15a, 15b, 16a and 16b are graphs that show measured resonant frequency shifts at various bias voltages and different loaded mass of exemplary mass sensors 10. Parameters for exemplary devices are L=50 μm, b=40 μm, and vd=1.26V, with a sensing platform length of 35 μm. The quality factor measured in air is in the range of 4,000. FIGS. 14a, 14b and FIGS. 15a, 15b show the measured frequency shifts at various bias voltages and the corresponding Q of the devices (L=50 μm, b=40 μm, and vd=1.26V) with the sensing platform length of 40 μm and 45 μm, respectively. The measured Q ranges from 3,800 to 4,400 in air, clearly showing that mass loading does not affect the Q values. Taking experimental errors and fabrication tolerances into account, the measured loaded mass is approximately consistent at different bias voltages for these devices and is in good agreement with theoretical calculation from Equations (26) and (28).

The performance of exemplary mass sensors 10 shown in FIGS. 13a, 13b, 14a, 14b, 15a, 15b, 16a and 16b is summarized in Table 1.

TABLE 1

Performance summary of the high-Q bulk-mode mass sensor with annexed sensing platforms

| | Sensing platform length (μm) | | |
|---|---|---|---|
| | 35 | 40 | 45 |
| Resonant frequency (MHz) | 13.392 | 12.245 | 11.534 |
| Bias voltage (V) | 140 | 110 | 110 |
| Drive and sense gap (nm) | 680 | 560 | 570 |
| Quality factor (Q) | 4400 | 3800 | 4000 |
| Motional resistance (MΩ) | 2.43 | 2.4 | 2.43 |
| Sensing current (μA) | 0.45 | 0.51 | 0.48 |
| Vibration amplitude (nm) | 12 | 12 | 13 |
| Stiffness (N/m) | $2.20 \times 10^5$ | $2.05 \times 10^5$ | $2.00 \times 10^5$ |
| Effective mass (pg) | $3.10 \times 10^4$ | $3.46 \times 10^4$ | $3.80 \times 10^4$ |
| Mass sensitivity (Hz/pg) | 215 | 177 | 151 |
| Minimum detectable mass (attogram) | 1.17 | 1.52 | 1.57 |

Both theoretical (23b) and measured (29) motional resistances of the mass sensors are 2.4 MΩ or so. The vibration amplitude at ~12 nm leads to leads to a sense current of 0.5 μA going through the mass sensors. A stiffness in the table is the equivalent modal stiffness, and varies with fabrication tolerance of the width of the separation beams. By varying the length of the sensing platform from 35 μm to 45 μm, the mass sensitivity can be tuned from 215 Hz/pg to 151 Hz/pg. Both the mass sensitivity and the quality factor of this device are much larger than the corresponding values (66 Hz/pg and Q<100 at freq<100 kHz) of a sub-micron thick cantilever, such as is disclosed by Amit Gupta, et al., in "Novel Fabrication Method for Surface Micromachined Thin Single-Crystal Silicon Cantilever Beams", Journal of Microelectromechanical Systems, Vol. 12, No. 2, April 2003, pp. 185-192. Based on Equation (27), the theoretical $\Delta m_{min}$ of this device in air is at the attogram level, which is comparable to that of a nanocantilever in vacuum.

Thus, high-Q length-extensional mass sensors 10 have been disclosed, that exhibit numerous advantages over micro/nano-cantilever-based mass sensors. With no need of a transducer assembly and with a large Q, the mass sensors 10 show better performance in air and compatibility with sensor array configuration. To lower the bias voltage, a HARPSS-on-SOI process can be used to reduce the capacitive gaps (<200 nm). Alternatively, piezoelectric transduction 18 can be used on the central block 11 of the sensor 10, providing more flexibility for using the device in various detection environments. The disclosed mass sensors 10 can be further integrated into oscillator circuits for sensor array configurations and further parallel detection.

The above-disclosed high quality factor (Q) mass sensors 10 having annexed platforms 12 offer the advantages of improved mass sensitivity at micron scale, high-Q in air, simplicity of fabrication, and improved reliability. The mass sensors 10 are capable of detecting sub-picogram mass change in air and in liquid. The sensitivity of such mass sensors 10 depends on lateral dimensions, and is independent of thickness. Un-deformed annexed platforms 12, coated with the selective binding layer 16 adsorbs agents, and may be used to avoid adsorption-induced stiffness changes, which lead to improved reliability of the mass sensors 10. The adsorption-induced stiffness change is negligible and the mass change is solely the reason for the frequency shift of the mass sensors 10.

The operating resonant mode shape of the mass sensors 10 shows that the annexed platforms 13 do not experience deformation but only translational movement. This feature is enabled by the use of slim separating beams 13, which prevent longitudinal waves from propagating to the platforms 12.

Compared with either cantilever-based or FBAR-based mass sensors, the high-Q mass sensors 10 having annexed platforms 12 offers the advantages of improved mass sensitivity at micron scale, high-Q in air, simplicity of fabrication, and improved reliability. The sensitivity of 60 Hz/picogram has been demonstrated at ~12 MHz. The mass sensors 10 use the longitudinal bulk-mode of a very simple structure with relatively large dimensions (208 µm×48 µm×10 µm) to achieve picogram-level sensitivity.

Thus, improved micromachined mass sensors have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Apparatus comprising:
   a. a central block separated from a substrate;
   b. two annexed platforms coupled to the central block by way of two separating beams that are separated from the substrate;
   c. one or more anchors coupled to the central block that are separated from the substrate by insulating material; and
   d. one or more transducers for actuating and sensing vibration of the central block and the annexed platforms.

2. The apparatus recited in claim 1, further comprising: a sense electrode that is coupled to a first annexed platform of the two annexed platforms and a drive electrode that is coupled to the a second annexed platform of the two annexed platforms.

3. The apparatus recited in claim 1 wherein the one or more transducers comprise capacitive drive and sense electrodes.

4. The apparatus recited in claim 1 wherein the transducer comprises piezoelectric drive and sense electrodes.

5. The apparatus recited in claim 1 wherein the transducer comprises piezoresistive drive and sense electrodes.

6. The apparatus recited in claim 1 further comprising: an insulating material disposed between the substrate and the one or more anchors.

7. The apparatus recited in claim 1 further comprising a selective binding layer disposed on the annexed platforms.

8. The apparatus recited in claim 1 wherein the one or more transducers comprises a capacitive transducer that further comprises a sense electrode coupled to a first annexed platform of the two annexed platforms and a drive electrode that is coupled to the a second annexed platform of the two annexed platforms.

9. The apparatus recited in claim 1 wherein the piezoelectric transducer comprises a sense electrode coupled to one lateral anchor and a drive electrode is coupled to the other lateral anchor.

10. The apparatus recited in claim 1 wherein the one or more anchors are coupled along a lateral axis by way of two support beams to the central block.

11. Capacitive sensing apparatus comprising:
   a. a central block separated from a substrate; two annexed platforms coupled to the central block along a block axis by way of two separating beams and that are separated from the substrate;
   b. one or more anchors coupled to the central block that are separated from the substrate by insulating material; and
   c. one or more transducers for sensing vibration of the central block and the annexed platforms that comprise a capacitive sense electrode coupled to a first annexed platform and a capacitive drive electrode coupled to a second annexed platform.

12. The apparatus recited in claim 11 further comprising a selective binding layer disposed on the annexed platforms.

13. A mass sensor, comprising:
   a. a substrate;
   b. a central block spaced apart from the substrate;
   c. two anchors that are coplanar with the central block and disposed coaxially with the central block along a first axis, each anchor coupled to the central block by a support beam that is narrower than the anchor;
   d. an insulating material disposed between each of the two anchors and the substrate;
   e. two annexed platforms that are coplanar with the central block and disposed coaxially with the central block along a second axis that is perpendicular to the first axis; each annexed platform coupled to the central block by a separating beam that is narrower than the annexed platform; and
   f. at least one transducer that is configured to actuate and to sense vibration of the central block and the annexed platforms.

14. The mass sensor of claim 13, wherein the at least one transducer comprises a capacitive drive and at least one sense electrode.

15. The mass sensor of claim 13, further comprising a selective binding layer disposed on the annexed platforms.

16. The mass sensor of claim 13, wherein the at least one transducer comprises a capacitive transducer that further comprises a sense electrode coupled to a first annexed platform of the two annexed platforms and a drive electrode that is coupled to the a second annexed platform of the two annexed platforms.

* * * * *

UNITED STATES PATENT AND TRADEMARK OFFICE
CERTIFICATE OF CORRECTION

| | | |
|---|---|---|
| PATENT NO. | : 7,819,011 B2 | Page 1 of 1 |
| APPLICATION NO. | : 11/450186 | |
| DATED | : October 26, 2010 | |
| INVENTOR(S) | : Zhili Hao and Farrokh Ayazi | |

It is certified that error appears in the above-identified patent and that said Letters Patent is hereby corrected as shown below:

Column 1, lines 14-15, please replace "Therefore, the government may have certain rights in this invention" with: "The Government has certain rights in the invention."

Signed and Sealed this
Fifteenth Day of May, 2012

David J. Kappos
*Director of the United States Patent and Trademark Office*